(12) United States Patent
Vaishnavi et al.

(10) Patent No.: US 10,771,334 B2
(45) Date of Patent: Sep. 8, 2020

(54) FORWARDING UNIT AND CONTROLLER UNIT FOR SDN

(71) Applicant: Huawei Technologies Co., Ltd., Shenzhen (CN)

(72) Inventors: Ishan Vaishnavi, Munich (DE); Riccardo Guerzoni, Munich (DE); David Perez, Munich (DE); Ramin Khalili, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/957,286

(22) Filed: Apr. 19, 2018

(65) Prior Publication Data

US 2018/0241621 A1    Aug. 23, 2018

Related U.S. Application Data

(63) Continuation of application No. PCT/EP2015/074255, filed on Oct. 20, 2015.

(51) Int. Cl.
*H04L 12/24* (2006.01)
*H04L 12/721* (2013.01)

(52) U.S. Cl.
CPC ............ *H04L 41/083* (2013.01); *H04L 45/72* (2013.01)

(58) Field of Classification Search
CPC .............................. H04L 41/083; H04L 45/72
See application file for complete search history.

(56) References Cited

U.S. PATENT DOCUMENTS 7,941,527 B1 * 5/2011 Jacoby ................. H04L 43/026
370/229
8,824,274 B1    9/2014 Medved et al.
(Continued)

FOREIGN PATENT DOCUMENTS

CN        103346922 A    10/2013
CN        104104520 A    10/2014
(Continued)

OTHER PUBLICATIONS

Bull et al., "Pre-emptive Flow Installation for Internet of Things Devices within Software Defined Networks", 2015 3rd International Conference on Future Internet of Things and Cloud, IEEE Computer Society, pp. 124-130, Institute of Electrical and Electronics Engineers, New York, New York (Aug. 2015).
(Continued)

*Primary Examiner* — Hassan Kizou
*Assistant Examiner* — Hector Reyes
(74) *Attorney, Agent, or Firm* — Leydig, Voit & Mayer, Ltd.

(57) ABSTRACT

A forwarding unit for a SDN system is provided, the forwarding unit being configured to forward data packets and comprising a memory module for storing at least one forwarding rule and a forwarding rule managing module, wherein the forwarding rule managing module is configured to activate the at least one forwarding rule according to a preset time condition and wherein the preset time condition comprises at least two activation times of the at least one forwarding rule and wherein the forwarding rule managing module is configured to activate the at least one forwarding rule at any one of the at least two activation times.

20 Claims, 9 Drawing Sheets

(56) References Cited

U.S. PATENT DOCUMENTS

| | | | |
|---|---|---|---|
| 9,231,916 B1* | 1/2016 | Kruglick | H04L 63/0263 |
| 2012/0099591 A1* | 4/2012 | Kotha | H04L 45/54 |
| | | | 370/392 |
| 2014/0369228 A1* | 12/2014 | Sampath | H04L 43/0894 |
| | | | 370/253 |
| 2016/0036597 A1 | 2/2016 | Liu et al. | |
| 2016/0149779 A1* | 5/2016 | Sampath | H04L 43/0817 |
| | | | 370/250 |
| 2016/0149819 A1* | 5/2016 | Hussain | H04L 45/38 |
| | | | 370/236 |

FOREIGN PATENT DOCUMENTS

| | | |
|---|---|---|
| WO | 2012119614 A1 | 9/2012 |
| WO | 2015106216 A1 | 7/2015 |

OTHER PUBLICATIONS

"OpenFlow Switch Specification, Version 1.5.0 (Protocol version 0x06)," Open Networking Foundation, pp. 1-277, (Dec. 2014).

Jin et al.,"Dynamic Scheduling of Network Updates," ACM SIGCOMM Computer Communication Review, vol. 44,No. 4, pp. 539-550 (Aug. 17, 2014).

"3rd Generation Partnership Project; Technical Specification Group Radio Access Network; Study on provision of low-cost Machine-Type Communications (MTC) User Equipments (UEs) based on LTE(Release 12)," 3GPP TR 36.888 V12.0.0, pp. 1-55, 3rd Generation Partnership Project, Valbonne, France (Jun. 2013).

Al-Fares et al.,"Hedera: Dynamic Flow Scheduling for Data Center Networks", Nsdi, vol. 10, No. 8, (Apr. 2010).

"IEEE Standard for Synchrophasor Data Transfer for Power Systems," IEEE Power and Energy Society, pp. 1-43, Std. C37.118.2-2011, Institute of Electrical and Electronics Engineers, New York, New York (Dec. 2011).

"OpenFlow Switch Specification,Version 1.5.1 ( Protocol version 0x06 )," Open Networking Foundation, pp. 1-283, (Mar. 26, 2015).

"Study on Low-Cost MTC UEs based on LTE", 3GPP TSG RAN WG1 Meeting #66bis, Zhuhai, China, R1-113204, 3rd Generation Partnership Project, Valbonne, France (Oct. 10-14, 2011).

Fallgren et al., "Scenarios, requirements and KPIs for 5G mobile and wireless system," ICT-317669-METIS/D1.1, METIS, Seventh Framework Programme, pp. 1-75, (Apr. 2013).

Bakken et al.,"Smart Generation and Transmission With Coherent, Real-Time Data", Proceedings of the IEEE, vol. 99, No. 6, pp. 928-951, Institute of Electrical and Electronics Engineers, New York, New York (Jun. 2011).

Mizrahi et al.,"Time-based Updates in OpenFlow: A Proposed Extension to the OpenFlow Protocol," CCIT Report #835, EE Pub No. 1792, pp. 1-11, Technion, Israel (Jul. 2013).

"Timed Text Working Group Delivering Captioning and Video Description for the Web," http://www.w3.org/AudioVideo/TT/, pp. 1-6, (May 24, 2018).

* cited by examiner

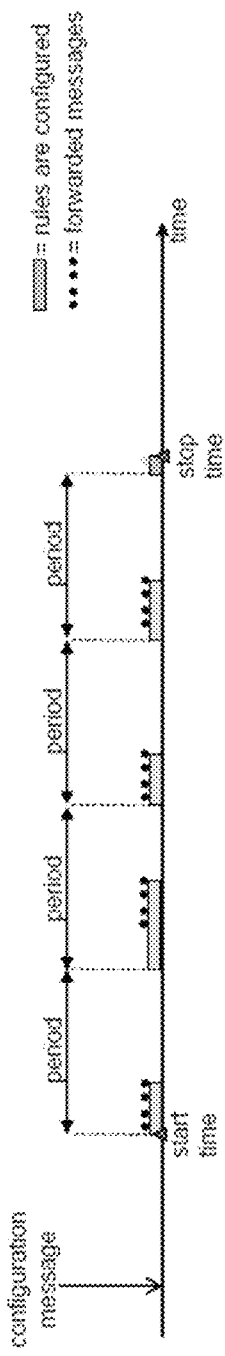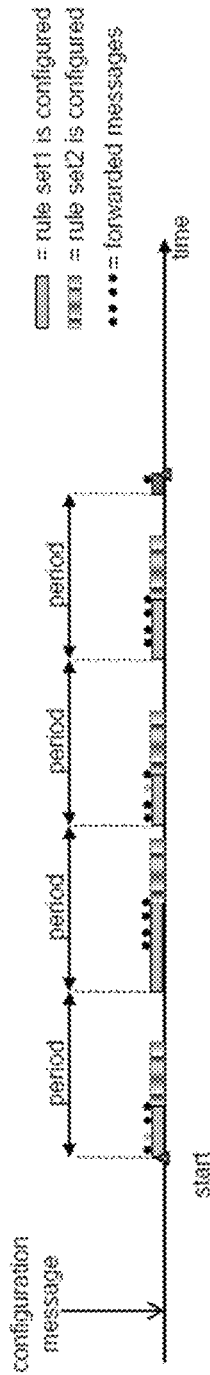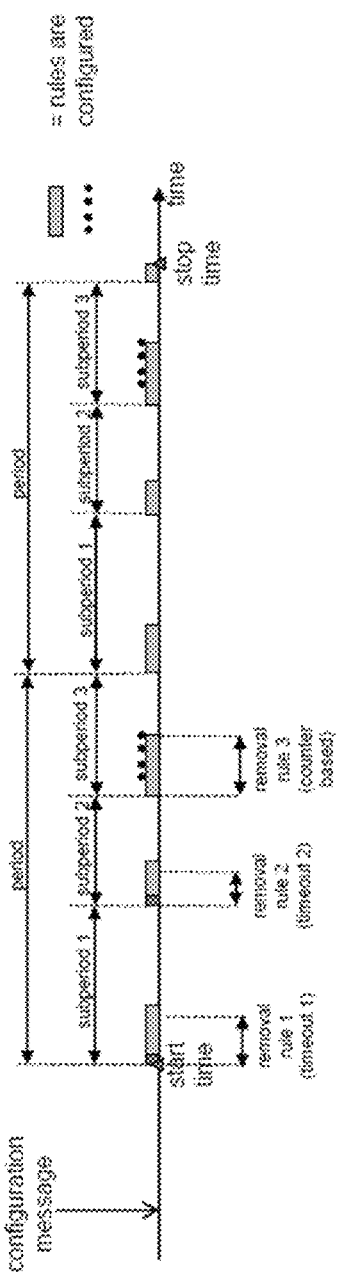
Fig. 8
Fig. 9
Fig. 10

FORWARDING UNIT AND CONTROLLER UNIT FOR SDN

CROSS-REFERENCE TO RELATED APPLICATIONS

This application is a continuation of International Application No. PCT/EP2015/074255, filed on Oct. 20, 2015, the disclosure of which is hereby incorporated by reference in its entirety.

TECHNICAL FIELD

The present disclosure relates to the technical field of data transmission networks, in particular to components used in software defined networks, SDN. Specifically, the present disclosure relates to a forwarding unit (may also be referred to as switch or switching unit) for a SDN system, a control unit (may also be referred to as controller) for a SDN system, an SDN system and a method for configuring forwarding rules for data packet transmission in an SDN system.

BACKGROUND

Software defined networking, SDN, is an approach that basically relates to decoupling the management and controlling tasks from data packet forwarding tasks. The management and controlling tasks are usually referred to as "control plane" whereas the forwarding tasks are referred to as "data plane." This decoupling can simplify the structure of a network and can standardize interfaces between individual components and between the control plane and data plane. Usually, the data plane is configured such that it necessarily requires control commands from the control plane in order to handle the forwarding tasks. Simply speaking, the 'intelligence' of an SDN system is provided in the control plane whereas the data plane simply carries out commands and instructions received from the control plane. One mechanism which relates to and defines the communication between the control plane and the data plane is OpenFlow. It should be understood that any reference to OpenFlow in the following generally relates to any mechanisms and interfaces which define the communication between the control plane and the data plane in SDN. Reference to OpenFlow is made representative for any of these mechanisms and interfaces.

The future networks (both telecom and Internet) are going to support millions and millions (even billions) of sensors as well as users using applications that will require sending periodic or recurrent control or data messages from one node to another. The term sensor is used herein as an example for any data source. The forwarding of such data messages is performed by the data plane and the components of the data plane. The future networks may be SDN based.

As mentioned above, the SDN approach to network design and management separates the control plane from the data plane of the network and may centralize the control plane to a logically single controller. An SDN network may be composed of simple switches (or forwarding elements) in the data plane and at least one intelligent SDN controller that configures how those switches behave by installing flow (or forwarding) rules on the switches. Flow rules are generally composed of match-action-pairs. The header and/or other parts of an incoming packet may be matched and in case of a match the switch may trigger actions such as forwarding to a certain port number, dropping the packet altogether, forwarding to the controller and so on. In case an incoming packet doesn't match any of the flow rules defined on the switch then the switch can send what is called a PACKET Ind. to the controller. The controller may analyze this PACKET INT and install newer flow rules on the switches to handle future such packets. The switches may have a limited fast memory size for installing these flow rules called TCAM (Ternary Content Addressable Memory). The switch may store the less used rules in an auxiliary memory and fetch them to the TCAM only when a match happens.

The problem with supporting a high number of sensors or other periodic data/signaling connections is that rules for all those sensors cannot exist at the same time in the TCAM or even in the auxiliary memory. Typically then these messages will generate PACKET Ms to the controller every period for the end to end path setup that must be processed by the controller. This may increase the communication overhead between the control plane and the data plane and may thus lead to increased latency in the SDN system.

T. Mizrahi et al., Time-based Updates in OpenFlow: A Proposed Extension to the OpenFlow Protocol, Israel Institute of Technology, describes an extension to OpenFlow protocol that allows time-triggered configuration updates. Such extension aims at coordinating network updates across multiple devices, e.g. a controller sends update messages to several OpenFlow switches with the same scheduled execution time. The controller can also configure a time-based sequence of updates by sending k update messages with k different update times.

M. Al-Fares et al., Hedera: *Dynamic Flow Scheduling for Data Center Networks* describes a dynamic flow scheduling system that efficiently utilizes aggregate network resources. In this solution, a central scheduler, based on regular updates of current network-wide communication demands, calculates the proper embedding of current flows in order to maximize the utilization of global network resources. Current flows can be moved to alternative paths if needed.

U.S. Pat. No. 8,824,274 relates to scheduled network layer programming within a multi-topology computer network. A Path Computation Element installs forwarding information to network nodes at the scheduled time for a scheduled path. This is a general path computation element, PCE, path reservation approach, wherein the reservation is done at a scheduled time in the future according to wishes of the application.

SUMMARY

It has been recognized that repetitively generating a PACKET_IN message to the controller is an unnecessary activity that increases controller load and in a relatively static network need not be done again and again. Furthermore, it may also increase end-to-end latency for periodic flows as the PACKET_IN processing and end-to-end path setup takes some time.

In view of this, it may be seen as an object of the disclosure to reduce the controller load and to increase the performance of an SDN system.

This object is achieved by the features of the independent claims. Further implementation forms are apparent from the dependent claims, the description and the figures.

According to an aspect of the disclosure, a forwarding unit for a software defined networking, SDN, system is provided. The forwarding unit is configured to forward data packets and comprises a memory module for storing at least one forwarding rule and a forwarding rule managing module. The forwarding rule managing module is configured to activate the at least one forwarding rule according to a preset time condition, wherein the preset time condition comprises at least two activation times of the at least one forwarding rule and wherein the forwarding rule managing module is configured to activate the at least one forwarding rule at any one of the at least two activation times.

The memory module can be configured to store multiple forwarding rules. The number of forwarding rules is not limited and can be any number of forwarding rules. The memory module relates to the memory of the forwarding unit and can comprise a persistent memory, an auxiliary memory, and the ternary content addressable memory, TCAM. The memory module may comprise several sections or memory elements which are separated physically or logically from each other such that the TCAM and the auxiliary memory can be in different sections or memory elements. Any forwarding rule can be copied from one memory element or section to another memory element or section if a state of the forwarding rule changes. A forwarding rule can be in an active state or in an inactive state, in other words, the rule is activated or deactivated.

The forwarding rule managing module is configured to autonomously configure the forwarding unit. The forwarding rule managing module can be a processor or controller.

The preset time condition is a plan or schedule for activating and deactivating a forwarding rule. The preset time condition may be assigned to the forwarding rule. Any forwarding rule of the forwarding unit can be assigned a specific preset time condition. The preset time condition is given or prescribed by a control unit of the SDN and transmitted to the forwarding unit. After receiving the forwarding rule with the preset time condition, the forwarding unit autonomously activates and deactivates the forwarding rules according to the preset time condition assigned to each one of the forwarding rules.

The activation time of the preset time condition comprises at least a start time of the active state or a time when to activate a forwarding rule. The preset time condition may further comprise an end time and/or a duration of the active state of a forwarding rule or when to deactivate the forwarding rule. In particular, the forwarding rule can be activated at any one of the activation times. The multiple activation times of a preset time condition refer to one and the same forwarding rule, because any preset time condition is assigned to one forwarding rule. However, it may also be possible to group multiple forwarding rules to a first group and to activate and deactivate the forwarding rules of the first group according to the same preset time condition. Nevertheless, by grouping multiple forwarding rules to build the first group, each one of the forwarding rules of the first group are assigned the specific preset time condition. The forwarding unit can contain any number of forwarding rules and any one of these forwarding rules can have its own scheduling, i.e., multiple activation times per each forwarding rule.

The forwarding rule managing module can activate and deactivate (change the state of) any forwarding rule out of a plurality of forwarding rules stored in the memory module of the forwarding unit. The active forwarding rules can be referred to being a subset of active forwarding rules. The subset of active forwarding rules is applied to incoming data packets.

The number of active forwarding rules is limited due to the processing capability of the forwarding unit or due to the size of the memory element which contains the active forwarding rules. Thus, the content of the subset of active forwarding rules is subject to change and can be configured according to current needs at a specific time during operation of the forwarding unit. This can be referred to as reconfiguration of the forwarding unit. No external communication of the forwarding unit is required for such a reconfiguration since the decision about the state of each forwarding rule is taken by the forwarding rule managing module which is part of the forwarding unit. In other words, the reconfiguration of the forwarding unit is carried out autonomously. When changing the state of a forwarding rule, that forwarding rule may be copied from a first memory block (memory element or memory section) to a second memory block, wherein in the second memory block only those forwarding rules are stored which are in the active state, such that only those forwarding rules stored in the second memory block can be applied to incoming data packets.

The forwarding rule is activated at any one of the at least two activation times, i.e. recurrent active states of a forwarding rule can be configured. Any forwarding rule will be activated only for a predefined period of time, in particular for that time period when data packets are expected at the incoming port of the forwarding units which must be handled with said forwarding rule. Alternatively, a forwarding rule may be activated until a predefined condition occurs, for example a number of messages to which that forwarding rule applies, is reached. After the active time of a forwarding rule said forwarding rule is removed from the memory block with the active forwarding rules thus enabling activating another forwarding rule and copying it to the memory block with the active forwarding rules. In other words, the limited space of the memory block used for the active forwarding rules can be used more efficiently.

This approach is in particularly advantageous in a scenario where data packets from a specific source addressed to a specific target (or data packets to be transmitted via a predefined route through the SDN system) are not sent continuously but at specific times which are known in advance. Thus, the forwarding unit has a dynamically changing configuration which is adapted to the current needs autonomously by the forwarding unit without any control commands of the control unit (beside from the initial configuration with the forwarding rule and the preset time condition for activating and deactivating this forwarding rule). In other words, this approach automatically adapts the forwarding unit to the requirements of incoming data packets varying in time.

Thus, with a single configuration message comprising the forwarding rule and the preset time condition for activating and deactivating the forwarding rule, wherein the configuration message is sent from the control unit to the forwarding unit, the forwarding unit can be configured to operate autonomously (i.e., without any additional configuration messages from the control unit) even in dynamically varying environments.

The forwarding unit and the described approach enables configuring a periodic configuration update of the forwarding rules with only one update message, e.g. execute a flow table update X every Y seconds. The forwarding unit carries out a configuration update periodically, i.e. it is a self flow loading switch, without requiring recurrent configuration messages from a controller of the SDN. In other words, the switches themselves are the ones that install (activate)/uninstall (deactivate) the forwarding information periodically, following a previously configured policy.

Drawbacks of increased controller load and increased end-to-end latency can be avoided by the approach described herein, in particular in a relatively static network, i.e., having repetitive sensor activities and/or recurrent data forwarding requirements.

The forwarding unit may be alternatively described as follows: the at least one forwarding rule can adopt an active state or an inactive state and the forwarding unit is configured to apply the at least one forwarding rule to a data packet only if the forwarding rule is in the active state, wherein the forwarding rule managing module is configured to change the state of the at least one forwarding rule according to a preset time condition, wherein the preset time condition comprises at least two activation times of the at least one forwarding rule and wherein the forwarding rule managing module is configured to activate the at least one forwarding rule at any one of the at least two activation times.

Some non-limiting examples of use cases where the approach described herein may be relevant are the following:

1. Mission critical vehicular communication: group communication among vehicles running traffic safety efficiency and safety applications in the same geographical area may determine the configuration of a multiplicity of data flows with significant consumption of forwarding rules in the involved forwarding elements (or switches).

2. Methods to make efficient usage of the forwarding rules may consider: Grouping the devices and configure sequentially and periodically set of forwarding rules related to different groups of devices. For instance, an application may organize the devices in N groups, scheduling the communication of each group Gn (n=1 . . . N) sequentially in periodic timeslots. In each timeslot the forwarding elements involved in the data flows shall configure only the forwarding rules related to the device groups active in the timeslot. Grouping the data flows per application and configure sequentially and periodically set of rules implementing data flows related to the same application. For instance, a group of devices perform N applications, each one requiring the implementation of specific forwarding rules. The service provider operating those applications may schedule the communication related to each application An (n=1 . . . N) sequentially in periodic timeslots. In each timeslot the forwarding elements involved in the data flows configure only the forwarding rules related to the applications active in the timeslot.

3. Massive deployment of sensors and actuators: data collection from sensors and configuration of actuators for applications requiring massive deployment of devices may determine periodic configuration of data flows to transfer small amount of data. 3GPP Rel-11 assumptions may be for 30.000 devices per 4G radio access cell, target for 5G may be set to 300000 per 5G radio access cell with a data rate in the order of 1kbps.

According to an embodiment of the disclosure, the preset time condition comprises at least two deactivation times of the at least one forwarding rule and the forwarding rule managing module is configured to deactivate the at least one forwarding rule at any one of the at least two deactivation times.

In particular, a first deactivation time leads to deactivation of the forwarding rule before it is activated again. In other words, any activation time—deactivation time—pair defines an active cycle of the forwarding rule, wherein the second activation time activates the forwarding rule after the first deactivation time deactivated it.

Any deactivation time is associated to one activation time such that one pair of activation and deactivation time defines a time period at which the related forwarding rule is active and non-active before and after said time period (except for the second activation time and any additional active times defined by other activation and deactivation times which defines a second active cycle of the forwarding rule).

The deactivation time can be an absolute date (day) plus time (for example using the coordinated universal time, UTC, format) or only a time, or the deactivation time can be determined based on a duration of the active cycle of the forwarding rule.

According to a further embodiment of the disclosure, the preset time condition comprises more than two activation times and time gaps between any two consecutive activation times are the same.

For example, the time gap between a first activation time and a directly subsequent second activation time can be a few seconds or a few minutes. The time gap between the second activation time and a subsequent third activation time is identical to the time gap between the first and second activation times. Having a constant or identical time gap between consecutive activation times results in a periodic activation of the respective forwarding rule.

Such a configuration may be advantageous in an environment with a lot of data packet sources which have to be forwarded by the forwarding unit. If the total number of forwarding rules is higher than the maximum allowed number of active forwarding rules, the periodic activation of forwarding rules can help overcome this resource conflict by activating only those forwarding rules which are required in the active state at a given point of time. Further, the forwarding unit does not require for this dynamic adaptation to the changing environment any control messages from a control unit since the multiple subsequent activation times are already known by the forwarding unit.

According to a further embodiment of the disclosure, the preset time condition comprises more than two activation times and a time gap between a first activation time and a second activation time is different from a second time gap between the second activation time and a third activation time.

In other words, the time gap between consecutive activation times varies and the activation of a forwarding rule can thus be adapted to any time schedule so that the active time of a specific forwarding rule can be adapted to the time at which data packets require that forwarding rule in the active state.

A forwarding rule may be activated multiple times, for example with the same or with different time lag between two subsequent active states of one and the same forwarding rule. Alternatively, a forwarding rule may be activated or deactivated according to relative time specifications: for example, a forwarding rule may be deactivated a few seconds after receiving a data packet which applies to that forwarding rule and may be activated again 30 minutes after receipt of that data packet. Relative time specification means that the start and end time of the active state of a forwarding rule depends on the received data packets which apply to the specific forwarding rule.

Thus, the configuration of the forwarding unit can be adapted to an environment which varies in a previously known manner. The forwarding unit can be dynamically configured to changing forwarding scenarios without any additional control messages (besides the initial configuration).

According to a further embodiment of the disclosure, the forwarding rule managing module is configured to add or subtract a guard time from the preset time condition.

A guard time is a safety buffer of safety cushion which has the effect that the effective activation and deactivation of a forwarding rule is done earlier (in case of the activation) or later (in case of the deactivation). This may add fault tolerance to the forwarding unit since the configuration of the forwarding unit does still correctly apply to an incoming data packet if the arriving time of the data packet deviates from the previously set data packet transmission schedule.

The guard time is a period of time which is subtracted from the start time or which is added to the end time of the preset time. As a result, the duration of the preset time is extended. In one embodiment, the guard time may be subtracted from the activation time and/or may be added to the deactivation time.

By extending the duration of the active state of a forwarding rule, a safety factor is added to the configuration of the forwarding unit as the forwarding unit can handle a data packet even if it arrives at the forwarding unit earlier or later than initially planned.

According to a further embodiment of the disclosure, the forwarding rule managing module is configured to activate a forwarding rule based on a trigger message received by the forwarding unit.

In other words, the initiating event for activating a rule is not the time but a trigger message, wherein the trigger message may be sent by a controller unit of the SDN system. This functionality can be implemented in addition or alternatively to the time triggered activation of a forwarding rule.

Thus, flexibility is added to the configuration of the forwarding unit. A trigger message can be sent in order to dynamically change or adapt the configuration of the forwarding unit to actual requirements for data packet forwarding. In this embodiment, the forwarding unit is configured to recognize the trigger message and to take the respective action, i.e. to activate the related forwarding rule. If the forwarding rule is transmitted to the forwarding unit during the initial configuration process, a trigger message can be defined and assigned to the forwarding rule. The trigger message may be different for each one of the forwarding rules. The trigger message may be a packet with a header and data. The header may comprise a flag which identifies the packet as a trigger message and the data may identify the forwarding rule to be activated.

According to a further embodiment of the disclosure, the forwarding rule managing module is configured to receive an instruction for installing a forwarding rule and the related preset time condition for activating the forwarding rule.

The receipt of a forwarding rule and an assigned time condition for activating and deactivating that forwarding rule may be referred to as initial configuration of the forwarding unit. Different forwarding rules can be installed at different times, i.e. the initial configuration does not require that at this step all forwarding rules and time conditions must be installed. Any forwarding rule can be initially configured individually and the forwarding unit can receive additional forwarding rules with assigned activation and deactivation time conditions at any time.

According to a further embodiment of the disclosure, the forwarding rule managing module is configured to refuse installation of the forwarding rule if the forwarding rule conflicts with already installed forwarding rules.

A conflict between forwarding rules happens, for example, when two forwarding rules contradict each other, for example relating to the target or to the next hop of the same data packet. In other words, a conflict arises when two independent forwarding rules can be applied to the same data packet and the actions of these forwarding rules are different. Another example of conflicting forwarding rules may be that the new forwarding rule is to be activated at a time at which the maximum number of active forwarding rules on the forwarding unit is already reached.

This embodiment enables the forwarding unit and the SDN system to detect a forwarding rule conflict early, i.e. at the configuration time and before the operation time.

According to a further embodiment of the disclosure, the forwarding rule managing module is configured to send a failure reporting message to a control unit, if after activating and before deactivating a forwarding rule the forwarding unit has received no data packet that applies to that forwarding rule.

This embodiment enables and facilitates error management, for example a faulty data source may be identified or a redundant, unnecessary or superfluous forwarding rule can be identified and deleted, which may increase the performance of the forwarding unit since the number of forwarding rules can be reduced.

In one embodiment, the forwarding unit may be configured to send a status report message to the control unit, wherein the status report message indicates the status of the forwarding unit. The status report message supports sending appropriate configuration commands by the control unit to the forwarding unit.

When a forwarding rule (flow entry) is removed, either by the control unit, a flow expiry mechanism, or by a forwarding unit (switch) eviction mechanism, the forwarding unit may need to check a flow rem flag of the flow entry (for example a OFPFF_SEND_FLOW_REM flag). If this flag is set, the forwarding unit sends a flow removed message to the control unit. Each flow removed message contains a complete description of the flow entry, the reason for removal (expiry, delete or eviction), the flow entry duration at the time of removal, and the flow statistics at the time of removal.

According to a further aspect of the disclosure, a control unit for a software defined networking, SDN, system is provided. The control unit is configured to configure at least one forwarding unit of the SDN system. The control unit comprises a configuration module for generating configuration commands for a forwarding unit, wherein the configuration command comprises at least one forwarding rule and a preset time condition for activating the at least one forwarding rule on the forwarding unit, and wherein the preset time condition comprises at least two activation times to instruct the forwarding unit to activate the at least one forwarding rule at any one of the at least two activation times.

The control unit is configured to generate and send the control commands described with reference to the forwarding unit. Therefore, it is to be understood that the details provided above with reference to the forwarding unit similarly apply to the control unit and are not repeated here. It is one aspect of the forwarding unit to activate and deactivate forwarding rules, where the control unit provides the necessary instructions and commands for the forwarding unit to meet its function, i.e. to activate and deactivate the forwarding rules according to the predetermined time condition.

The control unit comprises a configuration interface for transmitting the appropriate configuration commands to the forwarding unit. The information about when to activate a specific forwarding rule is transmitted to the forwarding unit together with the forwarding rule, i.e. during the initial configuration of said forwarding rule or of the forwarding unit. The configuration command can comprise multiple activation and deactivation times of a forwarding rule.

The forwarding rule is transmitted from the control unit to the forwarding unit once, namely when initially configuring the forwarding unit. When initially transmitting a forwarding rule to the forwarding unit, the preset time condition for activating and deactivating said forwarding rule is also transmitted to the forwarding unit. The preset time condition may be determined by an application, wherein the application transmits the time condition to the control unit and the control unit generates appropriate configuration commands according to the communication interface specification between the control unit and the forwarding unit. Thus, there is no need for subsequent transmission of forwarding rules, except when updating existing forwarding rules.

According to an embodiment of the disclosure, the control unit is configured to store the forwarding rules and the forwarding units to which the forwarding rules have been assigned, wherein the control unit is configured to determine configuration errors of the SDN system when receiving an error message from a forwarding unit relating to the forwarding of a data packet.

In other words, one control unit can configure multiple forwarding units and knows the forwarding rules configuration of any one of the multiple forwarding units. Thus, the control unit is able to identify configuration errors as it knows the forwarding rules from multiple or all of the forwarding units in the SDN.

According to a further embodiment of the disclosure, the configuration module is configured to update a forwarding rule on a forwarding unit by identifying the forwarding rule to be updated and by transmitting at least one parameter of the forwarding rule to be updated.

A forwarding rule may be identified with a unique ID which is set by the control unit and also known to the forwarding unit. By using this unique ID, a forwarding rule can be identified unambiguously. The parameters to be updated may be the conditions of the forwarding rule (match conditions) or at least one value of the predetermined time (activation status), for example activation time, deactivation time, duration, guard time. Updating a forwarding rule may also include deletion of a forwarding rule.

By transmitting only the parameters which require updating, the amount of transmitted data can be reduced.

According to a further embodiment of the disclosure, the control unit is configured to receive a failure message from a forwarding unit and to update a forwarding rule referred to in the failure message.

The failure message can be related to the data packet matches of the referred forwarding rule or to any other aspects of that forwarding rule, for example to a conflict. The control unit is configured to analyze the failure message and to take an action, if necessary. The required action can be determined by an application which is assigned to the control unit.

According to a further aspect, a software defined network, SDN, system is provided. The SDN system comprises at least one control unit as described in the related aspect and any one of the embodiments herein and at least one forwarding unit as described in the related aspect and any one of the embodiments herein, wherein the at least one control unit is configured to configure at least one forwarding rule of the at least one forwarding unit.

The details provided with respect to the forwarding unit and the control unit apply in an analogous manner to the SDN system.

The functioning of the SDN system can, in other words, be summed up as follows: An interface between the control unit (controller) and the forwarding unit (switch) is introduced such that the controller can indicate to all the switches in a path that a flow will occur periodically. This enables the switches to manage their flow tables more efficiently for when the flows may not exist. In addition active self-configuration of the flow rules in the network reduces the delay experienced by the flows themselves as well as reduces the controller load. The SDN is related to three aspects: specification of the interface between the controller and the switches (for example modifying the standard of communication between the controller and the switches) such that the described configuration commands can be transmitted, modifying the switch such that it can re-install (activate) flows every specified period (see details provided with respect to the forwarding unit above), modifying the controller such that it remembers the installation of periodic flows and in case of dynamicity in the network can re-associate the new PACKET_Ins to previously installed periodic flows (see details provided with respect to the control unit above).

According to a further aspect, a method for configuring forwarding rules for data packet transmission in a software defined network, SDN, system is provided. The method comprises the steps of:

identifying at least one forwarding rule and at least two activation times at which the at least one forwarding rule must be activated on a forwarding unit;

generating a configuration command based on the at least one forwarding rule and the at least two activation times by a control unit and transmitting the configuration command to the forwarding unit.

For details relating to the steps of this method, reference is made to the functioning of the forwarding unit and control unit elucidated above.

The at least two activation times may be referred to as a set of activation times which corresponds to the preset time conditions. The set of activation times may comprise more than two activation times and any number of activation times for a forwarding rule.

The method may further comprise the following steps:

activating the at least one forwarding rule by the forwarding unit according to the configured set of activation times, wherein the set of activation times comprises at least two activation times of the at least one forwarding rule, such that the at least one forwarding rule is activated at any one of the at least two activation times.

The method may further comprise the step of deactivating the forwarding rule according to the preset time condition, reference is made to the description above relating to deactivation of forwarding rules on the forwarding unit.

According to a further embodiment, the method steps are carried out by the SDN system and its components described herein.

It should be understood that the functioning described with reference to the forwarding unit and the control unit does also apply to the method. The functions of the forwarding and control units can be implemented as method steps.

According to an embodiment of the disclosure, the configuration command comprises at least two deactivation times, wherein any one of the deactivation times is assigned to one activation time, respectively, so that an active time of the forwarding rule is defined between each pair of activation and deactivation times.

The activation and deactivation times can be absolute times. Alternatively, the configuration command can comprise a duration of the active time of the forwarding rule, thus, the deactivation time is defined relatively and indirectly with reference to the activation time.

In the following, further aspects of the method and the SDN system with its components are described.

Use cases involving periodical or recurrent scheduling of data transmission from synchronized devices to application servers may determine the configuration of a huge amount of forwarding rules which relevance is limited to short periodical timeslots. Note that the method and the SDN system as well as its components are not limited to periodical cases, but can be extended to a case in which any time profile is defined by the controller to the switch. Since the number of configurable forwarding rules is a limited resource due to the limited size of the memory in the switches, periodical configuration of forwarding rules stored at the forwarding elements can be a method to spare this resource and in addition reduce controller processing burden.

The configuration message sent by a controller to setup periodic forwarding rules in a forwarding element may involve the following configurations:

Start and stop time for a periodic rule, which can be specified in the configuration message as absolute start/stop timestamps at which the forwarding element must start and stop the periodical configuration of a set of rules and/or as triggered by control messages, being the periodical configuration of rules started and/or stopped by control messages and/or as absolute start/stop timestamps in addition to a guard time which may be included at the start or at the stop of the periodical configuration of a set of rules.

Periodicity of the configuration of the set of rules can be defined by a simple period, by an event, such as the configuration and/or removal of a correlated set of rules, by one cyclic period with multiple sub-periods (and recursively sub-sub-periods and so on), by a timed-text like profile description called timed-match profile, also referred to as recurrent flow. The timed match profile defines at what time to install which flow rules.

Removal of forwarding rules can be defined by timeouts, by counters in the forwarding element, such as number of messages forwarded by the configured rule, by an event, such as the configuration and/or removal of a correlated set of rules.

A set of forwarding rules can be organized as a set with independent subset of rules, as a set with multiple correlated subset of rules.

If the switch and the controller are fully synchronized related to their internal clock, then the switch could set the rules exactly on times provided by the controller. If such fine-grain synchronization is not available as well as to account for the jitter in flow activation, the switch can install rules a little bit sooner by using some guard-time. The use of a guard-time and its value could be specified either by the controller or the switch itself. The guard time could also be used at the end of the period for which the rules are supposed to be valid not just at the start.

The combinations of the above mentioned configurations may result in different configuration schemes of the forwarding rules in the forwarding element and therefore different interfaces for the configuration or communication protocol between the controller and the switch.

BRIEF DESCRIPTION OF THE FIGURES

Embodiments of the disclosure will be described with respect to the following figures, in which:

FIG. 8 shows an activation and deactivation schedule of a forwarding rule according to an exemplary embodiment of the disclosure;

FIG. 9 shows an activation and deactivation schedule of a forwarding rule according to an exemplary embodiment of the disclosure;

FIG. 10 shows an activation and deactivation schedule of a forwarding rule according to an exemplary embodiment of the disclosure;

DETAILED DESCRIPTION OF EMBODIMENTS

Figure 1:
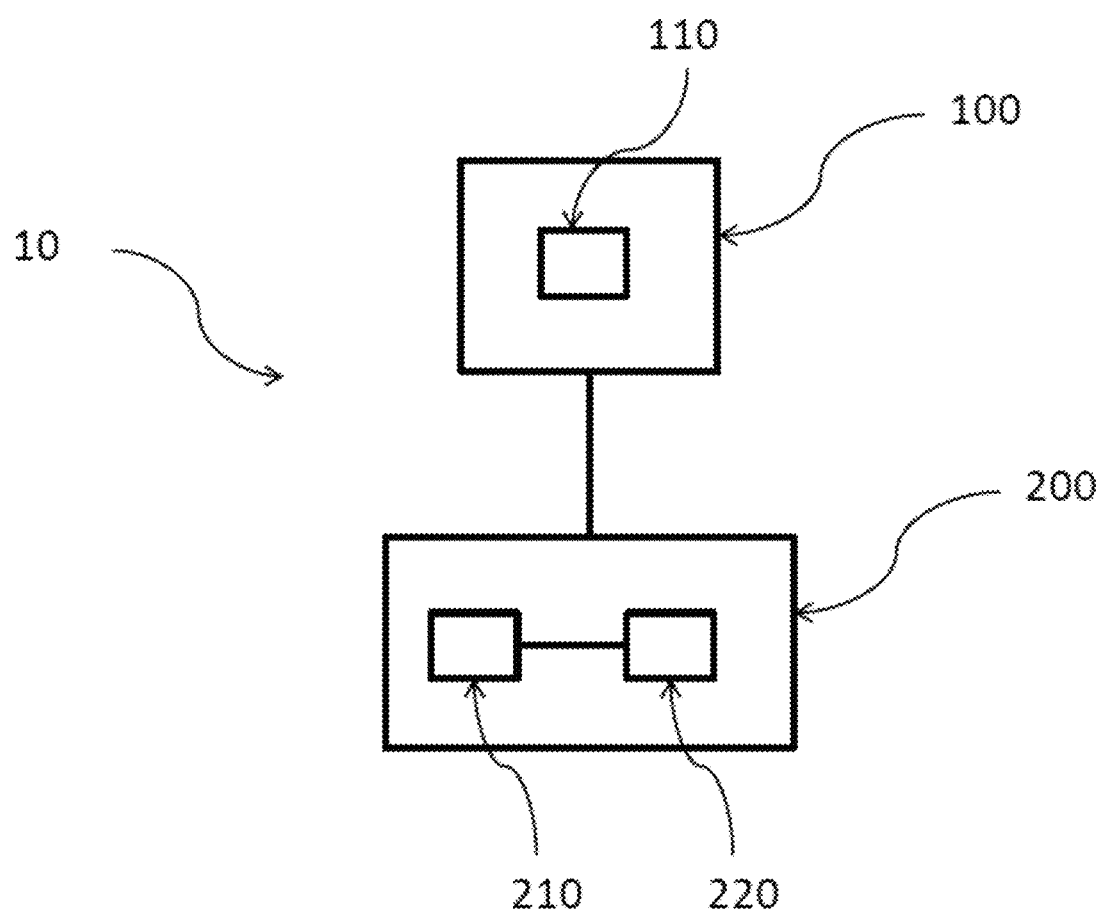
FIG. 1 schematically shows an SDN system according to an exemplary embodiment of the disclosure.

FIG. 1 schematically provides an overview of the structure of an SDN system 10. The control plane 100 is separated from the data plane 200. The control plane 100 is formed by at least one control unit 110 which controls the configuration and the functioning of the data plane, in particular the configuration of forwarding rules on the forwarding unit 210, 220 of the data plane.

The SDN system 10 and its components is configured to carry out the functions as described above with reference to the method for configuring forwarding rules for data packet transmission in a software defined network, SDN, system, and further with reference to the forwarding unit and control unit.

Figure 2:
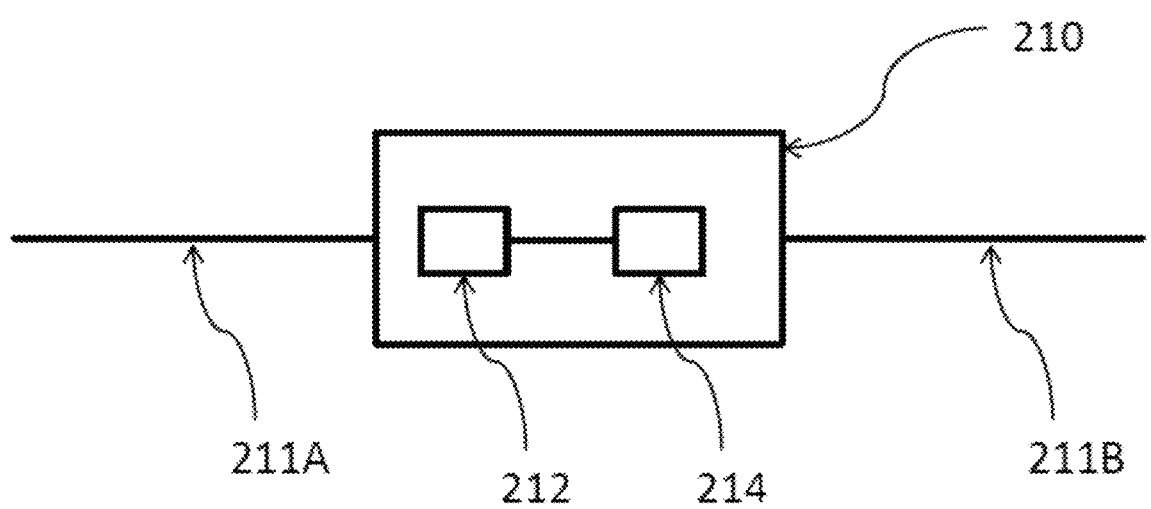
FIG. 2 schematically shows a forwarding unit according to an exemplary embodiment of the disclosure.

FIG. 2 shows a forwarding unit 210 comprising a first port 211A, a second port 211B, a forwarding rule managing module 212 and a memory module 214.

The first port 211A may be an incoming port (receiving data packets) and the second port 211B may be an outgoing port (transmitting outgoing data). The forwarding unit may comprise more than two ports and any one of these ports can be configured to receive and transmit data packets. A forwarding rule may be configured to determine the outgoing port for any received data packet thus defining the route of the data packet through the data plane.

Figure 3:
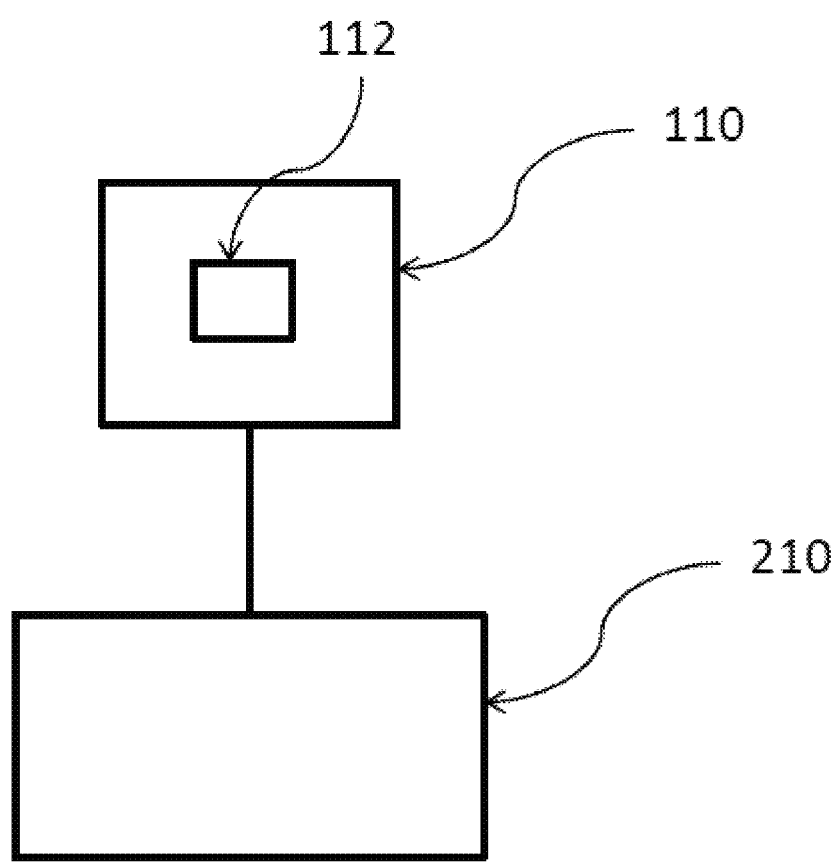
FIG. 3 schematically shows a control unit and a forwarding unit according to an exemplary embodiment of the disclosure.

FIG. 3 illustrates the relation between a control unit 110, which comprises a configuration module 112, and a forwarding unit 210. The control unit 110 is configured to send configuration commands to the forwarding unit 210, wherein the configuration commands define the data packet forwarding function of the forwarding unit as described above and hereinafter. The configuration module 112 is configured to generate the flow rules and the time condition for activating and deactivating said flow rule.

Figure 4:
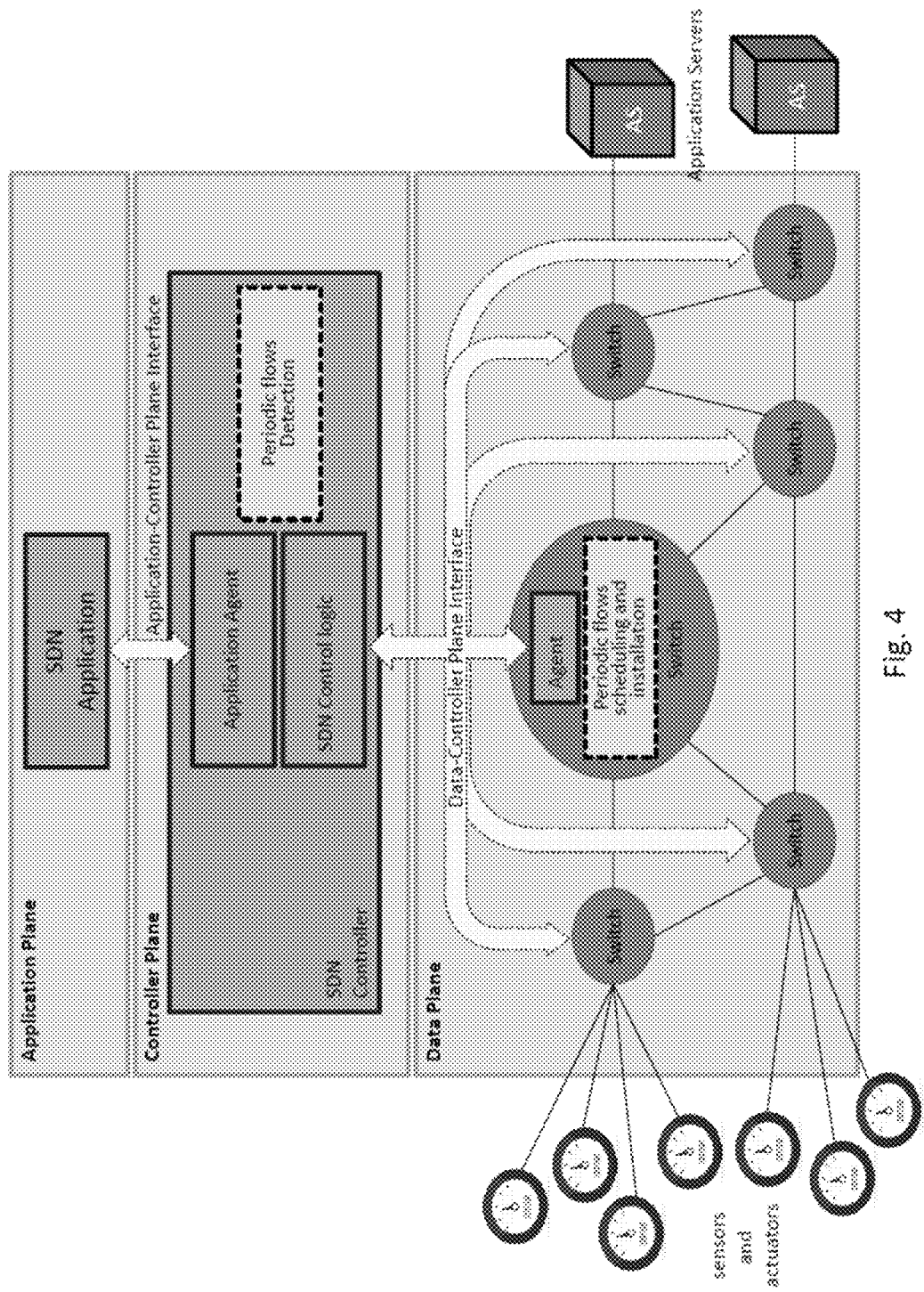
FIG. 4 shows the structure of a SDN system according to an exemplary embodiment of the disclosure, the SDN system being separated in a control plane and a data plane.

FIG. 4 illustrates the general structure of an SDN system. The SDN system comprises an application plane, a control plane (controller plane) with a controller (which will be described in more detail below) and a data plane with multiple switches. The switches establish a data transmission network for transmitting data packets from a data source (e.g., sensors and actuators as shown) to recipients (application servers, AS) of the sent data packets.

FIGS. 5 to 12 show activation and deactivation schemes for at least one forwarding rule of the forwarding unit. In these drawings, the active time of a forwarding rule is shown and is labeled in the drawings with "rules are configured". This means that the respective forwarding rule is active. The time between activation and subsequent deactivation will be referred to as "active cycle" of a forwarding rule.

Figure 5:
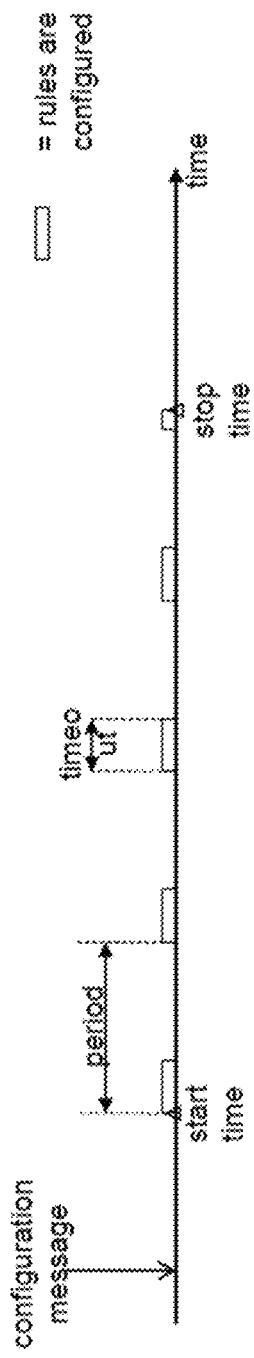
FIG. 5 shows an activation and deactivation schedule of a forwarding rule according to an exemplary embodiment of the disclosure.

FIG. 5 shows an activation scheme of a forwarding rule having five active cycles. The initially sent configuration message transmits the forwarding rule and the activation/deactivation scheme to the forwarding unit which subsequently autonomously activates and deactivates the forwarding rule according to that scheme.

When referring to the period of a preset time condition, reference is made to the time between two subsequent activation times of one forwarding rule. In the example of FIG. 5, the forwarding rule can be deleted after the stop time of the fifth active cycle. Thus, the forwarding rule is configured to be active during the shown active cycles.

After reaching the predefined duration of an active cycle, i.e. meeting the timeout condition, the forwarding rule is deactivated.

Figure 6:
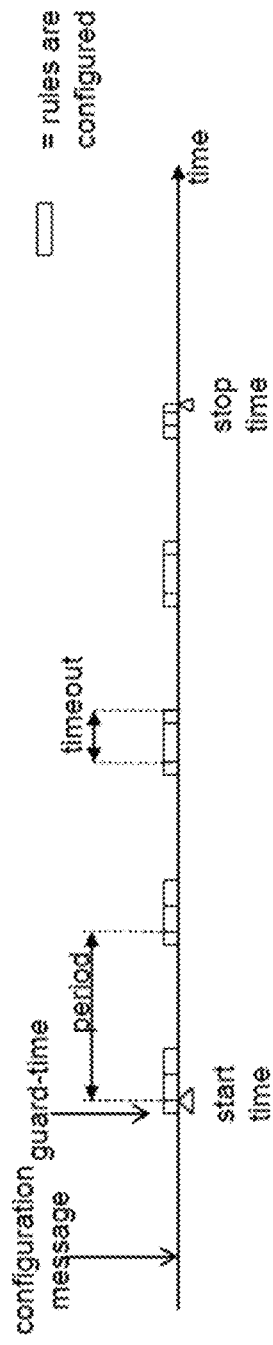
FIG. 6 shows an activation and deactivation schedule of a forwarding rule according to an exemplary embodiment of the disclosure.

FIG. 6 shows an activation scheme which provides some guard time before any activation of the forwarding rule, i.e. the forwarding rule is activated earlier than defined in the activation scheme. It should be noted that the guard time can also be added to the deactivation time such that the forwarding rule is effectively deactivated later than defined in the scheme.

The guard-time has the effect that the forwarding rule is installed a little bit earlier than it should. Alternatively, the switch may itself introduce guard times when not specified by the controller. Guard times may be on either side of the period when the rules are supposed to be active.

Figure 7:
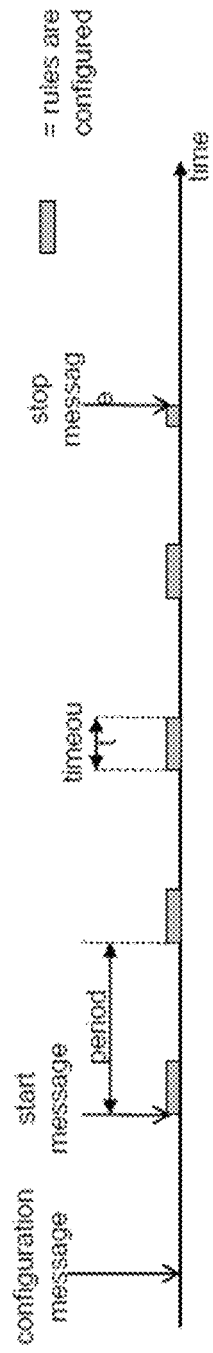
FIG. 7 shows an activation and deactivation schedule of a forwarding rule according to an exemplary embodiment of the disclosure.

FIG. 7 shows an activation scheme where the forwarding rule is activated by a trigger message (start message) and deactivated by another trigger message (stop message). It should be noted that in the example of FIG. 7 the trigger messages start the previously defined activation scheme and not the individual active cycle. In other words, the start message activates the forwarding rule and the subsequent active cycles are configured according to the activation scheme until the forwarding unit receives the stop message.

Alternatively, any individual active cycle of a forwarding rule can be activated by a start message and deactivated by a stop message. In this scenario, the activation scheme of the forwarding rule comprises only one activation time which is initialized when receiving the start message and stopped when receiving the stop message.

FIG. 8 shows an activation scheme having absolute start/stop timestamps with a simple period between subsequent active cycles. The removal of the forwarding unit is based on counters, e.g. the number of forwarded messages. When reaching a predefined value of forwarded messages, the forwarding rule is removed.

FIG. 9 shows an activation scheme for two forwarding rules. The first forwarding rule or rule set is indicated with the dots above the active cycle and the second forwarding rule is attached to the first one. The first forwarding rule is activated similar to that shown in FIG. 8 wherein the second forwarding rule is triggered by the deactivation of the first forwarding rule. The second forwarding rule is deactivated based on timeout.

FIG. 10 shows an activation scheme with different removal conditions, namely timeout (sub periods 1 and 2) or counters (sub period 3). The activation and deactivation in the sub periods is done similar than described with reference to the previous drawings.

Figure 11:
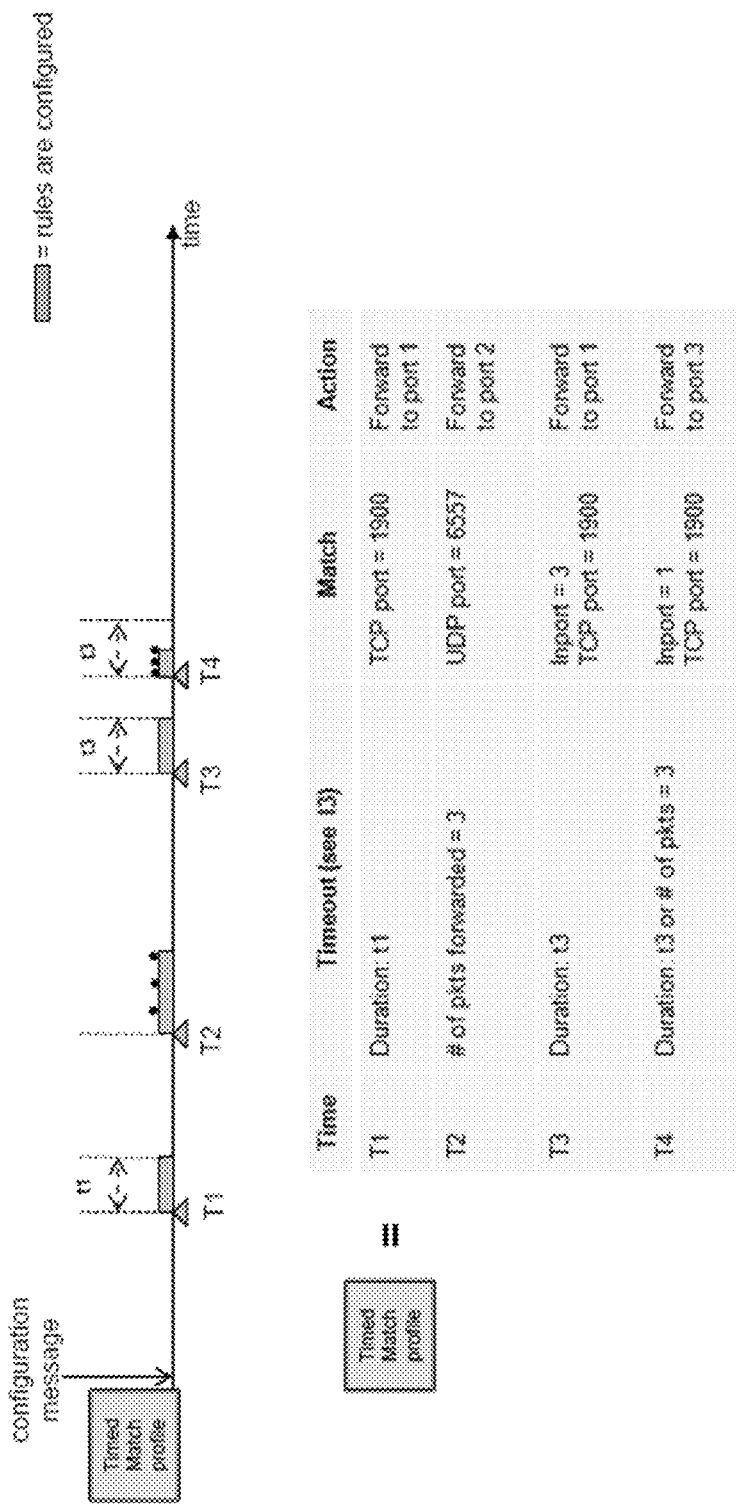
FIG. 11 shows an activation and deactivation schedule of a forwarding rule according to an exemplary embodiment of the disclosure.

FIG. 11 shows a forwarding rule activation scheme with recurrent flows with timed-match profile, wherein each rule is setup on specified time with specified match—action and other variables.

Various interfaces for configuring the forwarding unit via a communication protocol can be implemented by the combination of the four aspects (time, timeout, match, and action) shown in FIG. 11. Each of those interfaces can be expressed by a four tuple set.

Figure 12:
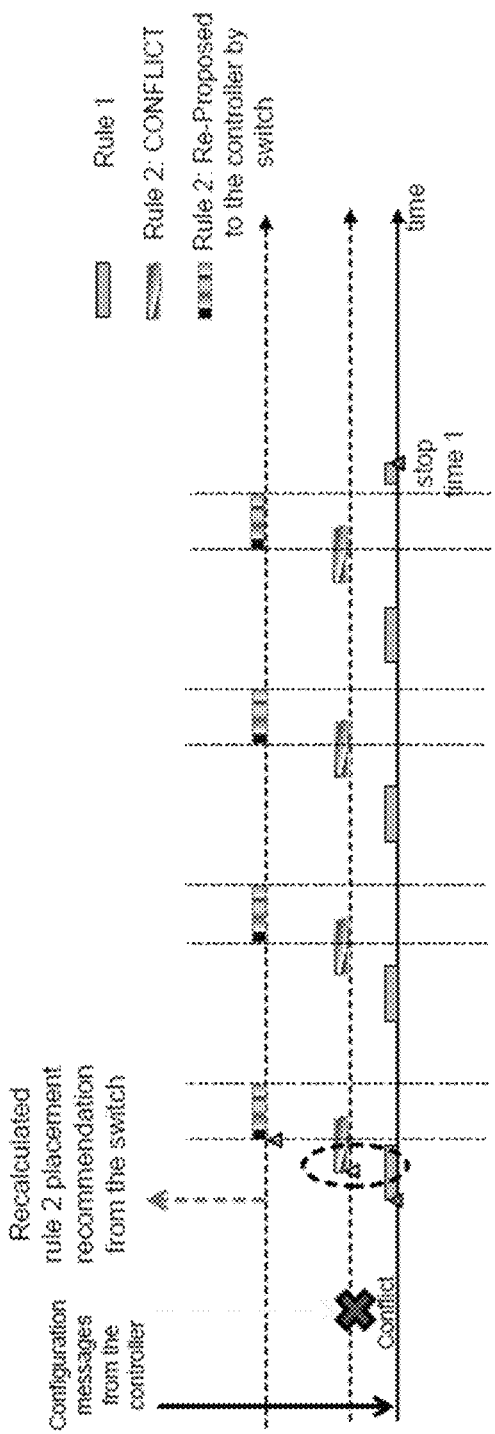
FIG. 12 shows an activation and deactivation schedule of multiple forwarding rules according to an exemplary embodiment of the disclosure.

FIG. 12 illustrates how the forwarding unit recognizes and handles conflicting forwarding rules.

The forwarding unit has the ability to refuse the installation of a periodic rule because it may conflict with another existing flow rule (a conflict could be the same match field) in the time it is valid or there is no more space in the allotted periodic set of flows during the requested time. The forwarding unit may recalculate flows to avoid conflicts and/or optimize flow table size.

There may then be an interface between the switch and the controller using which the controller can request the switch to schedule the periodic request if the device requesting the period is capable of this flexibility. The switch may reply with the specific period with the appropriate start/stop time and the other parameters specified it can support. The controller then must confirm this period in order to establish the flow rule.

FIG. 12 has a forwarding rule (lower horizontal line). The middle horizontal line shows the active cycles of an incoming configuration command which conflicts with the existing forwarding rule and the forwarding unit recalculates the schedule of the incoming configuration command and sends a recommendation (upper horizontal line) for the activation scheme for said incoming forwarding rule to the controller.

Figure 13:
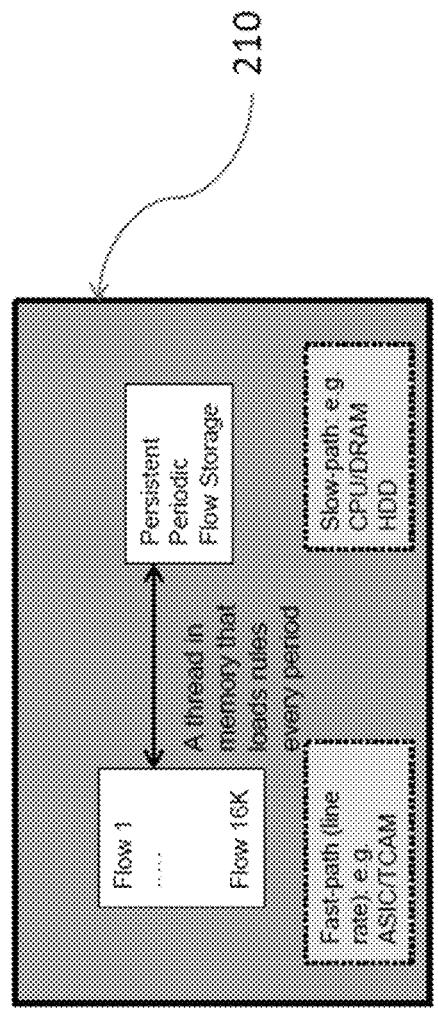
FIG. 13 shows a forwarding unit according to an exemplary embodiment of the disclosure.

FIG. 13 shows a forwarding unit 210. The forwarding unit 210 comprises memory blocks, namely a fast-path, e.g. TCAM or ASIC and a slow-path for persistent periodic flow storage. The forwarding unit is configured to carry out at least one or more or all of the following functions:

Remove the flow rules when the period expires; Store the periodic flows in a persistent or any other kind of a data storage when not actively in force; Fetch the periodic flows from the data storage in time for them to be installed; and install them on its flow table.

Besides those the switch may be capable of refusing the flow installation in case of conflicts and scheduling and proposing an alternate start/stop time and other parameters to the controller.

There are, for example, two ways the periodic flows are loaded from the memory into the flow table:

AdHoc: In this case the switch loads the periodic flow and replaces an existing flow based on a replacement policy in the flow table.

Define flow table area reserved for loading periodic flows: Here there is a flow table area reserved only for periodic flows possibly subject to a minimum and maximum size. Above the maximum the switch is not allowed to install any flow rule periodic in nature at that given time. This then means that the switch can schedule when it is able to install flows and when it is not.

Summing up, the forwarding unit (switch) can reinstall rules periodically itself, raise alarm to the controller if the packets for that flow don't show up, may report on time slots satisfying a certain frequency when it has spare flow table resources, may refuse the acceptance of a rule if no place in the flow table exists at that time.

Figure 14:
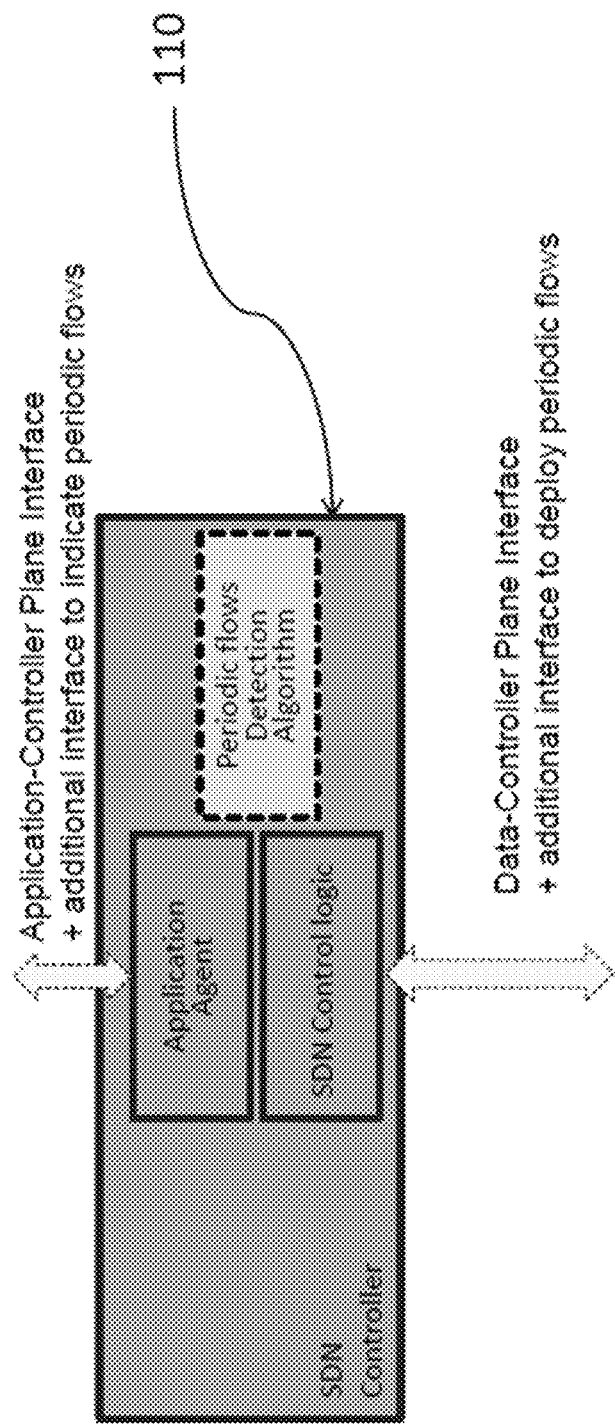
FIG. 14 shows a control unit according to an exemplary embodiment of the disclosure.

FIG. 14 shows a control unit 110. The control unit 110 is configured to communicate with a forwarding unit and with an application.

The control unit 110 exposes an application programming interface, API, to applications to enable them to specify periodic flows and including the parameters specified above with reference to FIG. 11, for example. Based on the information provided by the application and/or its own scheduling calculations and study of flow properties, the controller can install periodic flows on the switch. The control unit 110 may propose to the application using an application-controller plane interface the scheduling for the flows as proposed by the switch, which is shown in FIG. 12. The control unit 110 may run a function that detects the installation of periodic flows by the application, in the network or by monitoring the performance of flows in the network even when not explicitly stated by the application. Further, the control unit 110 stores the periodic flows installed in the network to be able to match an incoming PACKET_IN or errors due to the previously installed periodic flow not being functional anymore. After recognizing this match the controller can recalculate the path and install the periodic flow in the new switches to the path and delete the periodic flows in the switches that are no longer on the path. This may be required in case of dynamism in the network where the previously installed paths may be rendered incorrect.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Various embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this specification includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A forwarding device for a software defined networking (SDN) system, the forwarding device being configured to forward data packets and comprising:
    an incoming port;
    a memory module configured to store at least one forwarding rule; and
    a processor configured to:
        receive a configuration message from a control device of the SDN system, the configuration message including: the at least one forwarding rule, and a preset time condition for activating and deactivating the at least one forwarding rule; and
        activate the at least one forwarding rule according to the preset time condition, wherein:
            the preset time condition comprises at least two activation times of the at least one forwarding rule; and
            the processor is further configured to autonomously activate the at least one forwarding rule at any one of the at least two activation times and in the absence of receiving any control commands from the control device, wherein:
                the at least one forwarding rule is activated according to the preset time condition for a predetermined period of time; and
                the predetermined period of time includes a time period when data packets are expected at the incoming port which must be handled by the at least one forwarding rule.

2. The forwarding device of claim 1, wherein the preset time condition further comprises at least two deactivation times of the at least one forwarding rule, and wherein the processor is further configured to autonomously deactivate the at least one forwarding rule at any one of the at least two deactivation times and in the absence of receiving any control commands from the control device.

3. The forwarding device of claim 1, wherein the preset time condition further comprises more than two activation times and time gaps between any two consecutive activation times are the same.

4. The forwarding device of claim 1, wherein the processor is further configured to add or subtract a guard time from the preset time condition.

5. The forwarding device of claim 1, wherein the memory module is further configured to store a plurality of forwarding rules including a subset of active forwarding rule(s), and wherein the processor is further configured to autonomously reconfigure the forwarding device to facilitate applying only active forwarding rules to incoming data packets in the absence of communication external to the forwarding device.

6. The forwarding device of claim 1, wherein the processor is further configured to receive an instruction for installing a forwarding rule and the related preset time condition for activating the forwarding rule.

7. The forwarding device of claim 6, wherein the processor is further configured to refuse installation of the forwarding rule if the forwarding rule conflicts with already installed forwarding rules.

8. The forwarding device of claim 1, wherein the processor is further configured to send a failure reporting message to the control device of the SDN system, if after activating and before deactivating a forwarding rule the forwarding device has received no data packet that applies to that forwarding rule.

9. A control device for a software defined networking (SDN) system, the control device being configured to configure the forwarding device of claim 1, the control device comprising:
   a processor configured to generate the configuration message for the forwarding device; and
   a configuration interface configured to transmit the configuration message to the forwarding device.

10. The control device of claim 9, further comprising a memory device, wherein the control device is further configured to:
    store, in the memory device, the at least one forwarding rule and the forwarding device to which the at least one forwarding rule is assigned; and
    determine configuration errors of the SDN system when receiving an error message from the forwarding device relating to the forwarding of the data packet.

11. The control device of claim 9, wherein the processor of the control device is further configured to update a forwarding rule on the forwarding device by:
    identifying a forwarding rule to be updated; and
    transmitting at least one parameter of the forwarding rule to be updated.

12. The control device of claim 11, wherein the control device is further configured to:
    receive a failure message from the forwarding device; and
    update a forwarding rule referred to in the failure message.

13. A method for configuring forwarding rules for data packet transmission in a software defined network (SDN) system, the SDN system including a forwarding device and a control device, the method comprising:
    identifying at least one forwarding rule and at least two activation times at which the at least one forwarding rule must be activated on at least one forwarding device;
    generating and transmitting, by the control device, a configuration message including: the at least one forwarding rule, and a preset time condition for activating and deactivating the at least one forwarding rule, the preset time condition including the at least two activation times of the at least one forwarding rule;
    receiving, by the forwarding device, the configuration message from the control device; and
    autonomously activating, by the forwarding device in the absence of receiving any control commands from the control device, the at least one forwarding rule according to the preset time condition and at any one of the at least two activation times, wherein:
        the at least one forwarding rule is activated according to the preset time condition for a predetermined period of time; and
        the predetermined period of time includes a time period when data packets are expected at an incoming port of the forwarding device which must be handled by the at least forwarding rule.

14. The method of claim 13, wherein the configuration message further comprises at least two deactivation times, and wherein any one of the deactivation times is assigned to one activation time so that an active time of the at least one forwarding rule is defined between the activation and deactivation times.

15. The forwarding device of claim 1, wherein the processor is further configured to control the forwarding device to forward a data packet received by the forwarding device to another device according to the activated at least one forwarding rule.

16. The forwarding device of claim 1, wherein the processor is further configured to remove the at least one forwarding rule from the memory module after an active time of the at least one forwarding rule.

17. The forwarding device of claim 1, wherein the memory module is further configured to store at least one active forwarding rule, and wherein the processor is further configured to activate another forwarding rule and copy it to the memory module.

18. The forwarding device of claim 1, wherein the processor is further configured to receive a single configuration message from the control device to facilitate operation of the forwarding device in the SDN system autonomously of the control device.

19. The control device of claim 11, wherein the processor of the control device is further configured to update the forwarding rule on the forwarding device by deleting the forwarding rule.

20. A forwarding device for a software defined networking (SDN) system, the forwarding device being configured to forward data packets and comprising:
    a memory module configured to store a plurality of forwarding rules including a subset of active forwarding rule(s); and
    a processor configured to:
        receive a single configuration message from a control device of the SDN system, the configuration message including: at least one forwarding rule of the plurality of forwarding rules, and a preset time condition for activating and deactivating the at least one forwarding rule;
        activate the at least one forwarding rule according to the preset time condition, wherein:
            the preset time condition comprises at least two activation times of the at least one forwarding rule; and
            the processor is further configured to:
                autonomously activate the at least one forwarding rule at any one of the at least two activation times and in the absence of receiving any additional configuration messages from the control device, wherein:
                    the at least one forwarding rule is activated according to the preset time condition until a predefined condition occurs; and
                    the predefined condition includes reaching a number of messages to which the at least one forwarding rule applies; and autonomously reconfigure the forwarding device to facilitate applying only active forwarding rules to incoming data packets in the absence of communication external to the forwarding device.

* * * * *